United States Patent [19]

Manhart

[11] Patent Number: 5,080,490

[45] Date of Patent: Jan. 14, 1992

[54] EQUAL PATH, PHASE SHIFTING, SAMPLE POINT INTERFEROMETER FOR MONITORING THE CONFIGURATION OF SURFACES

[75] Inventor: Paul K. Manhart, No. Hollywood, Calif.

[73] Assignee: The United States of America as represented by the Administrator of the National Aeronautics and Space Administration, Washington, D.C.

[21] Appl. No.: 527,509

[22] Filed: May 23, 1990

[51] Int. Cl.$^5$ .............................................. G01B 9/02
[52] U.S. Cl. .................................. 356/351; 356/360; 356/363
[58] Field of Search ................ 356/351, 358, 360, 363

[56] References Cited

U.S. PATENT DOCUMENTS

| 4,022,532 | 5/1972 | Montagnino | 356/361 |
| 4,883,357 | 11/1989 | Zanoni et al. | 356/363 |
| 4,958,931 | 9/1990 | Tatian | 356/360 |

OTHER PUBLICATIONS

Roland Shack, Final Report, Task 1, "A Simple Tilt and/or Phase Sensor," Univeristy of Arizona.
G. Chanan, et al., "Keck Telescope Primary Mirror Segments: Initial Alignment and Active Control," Keck Observatory Report No. 171, Apr. 1988.
J. Nelson, et al., "Aberration Correction in a Telescope with a Segmented Primary," Keck Observatory Report No. 180 (also published in SPIE Proceedings on Active Telescope Systems, vol. 1114, Orlando, FL Mar. 1989).

Primary Examiner—Samuel Turner
Attorney, Agent, or Firm—Thomas H. Jones; John R. Manning

[57] ABSTRACT

A system for monitoring the configuration of a surface (e.g., a segmented parabolic surface) using orthogonally-placed retroreflectors at sets of points A, B and C dispersed throughout the surface with a stationary halfwave plate HWP in the front of the one retroreflector at a corner point C and a rotating halfwave plate RHWP over a source of linearly polarized coherent light, thereby causing the direction of linear polarization to continuously rotate through 360° and causing light returned by the retroreflector at point C to be continuously phase shifted through 360° relative to light returned by retroreflectors at points A and B. The returned light from each set of points A, B and C is focused onto a bed-of-nails (BON) phase grating diagonally oriented with respect to the orthogonal orientation of the incident beams from retroreflectors A, B and C, thereby causing overlap in the light from points A and C and from points B and C to produce interferometric signals AC and BC. Any change in phase of the interferometric signals AC and BC indicates both the magnitude and direction of any change in the position of the retroreflector at point C relative to retroreflectors at points A and B.

6 Claims, 3 Drawing Sheets

RETROREFLECTOR AT POSITIONS A AND B

RETROREFLECTOR WITH HALF WAVE PLATE AT POSITION C

FIG. 5
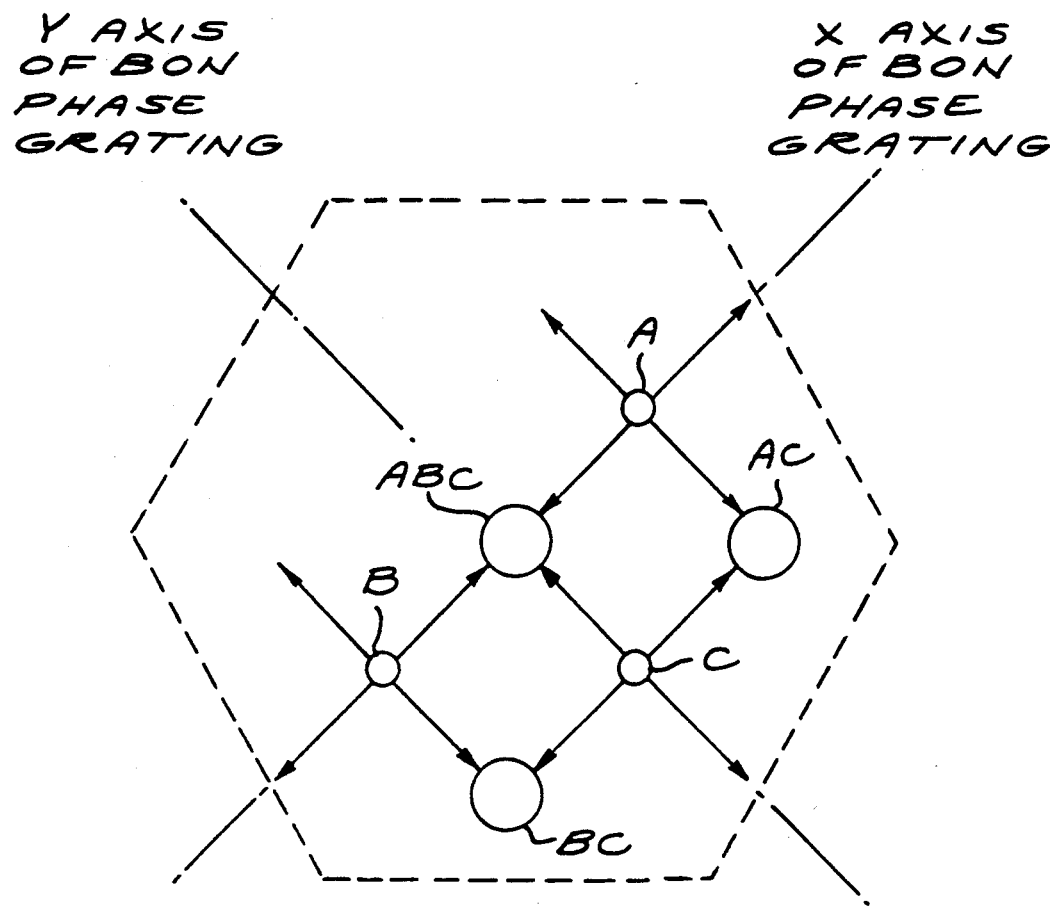
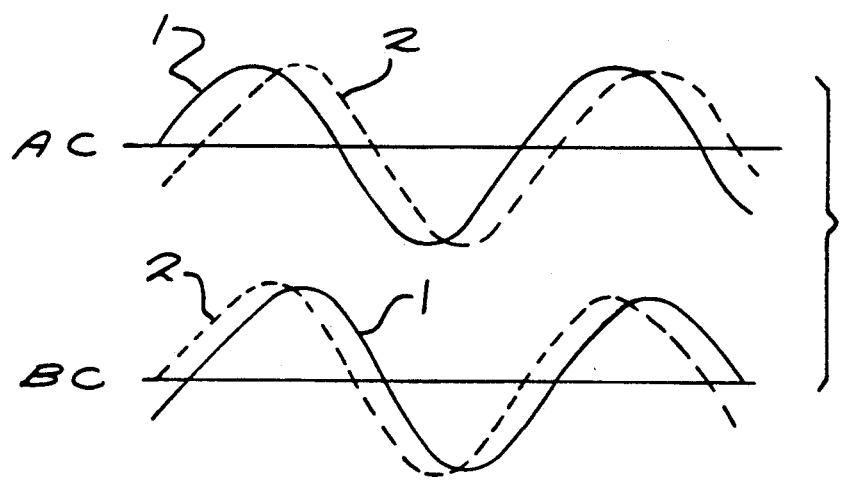
FIG. 6

EQUAL PATH, PHASE SHIFTING, SAMPLE POINT INTERFEROMETER FOR MONITORING THE CONFIGURATION OF SURFACES

ORIGIN OF THE INVENTION

The invention described herein was made in the performance of work under a NASA contract, and is subject to the provisions of Public Law 95-517 (35 USC 202) in which the Contractor has elected not to retain title.

TECHNICAL FIELD

The invention relates to an equal path, sample point system for monitoring the configuration (position and optical figure) of a surface by monitoring the phase shift of light reflected from points orthogonally spaced on segments of a segmented surface or sections of a nonsegmented (monolithic) surface using a coherent light beam to monitor for interferometric changes in the coherent light beam returned from reflecting points on the surfaces and more particularly to an equal path, phase shifting, sample point interferometer for monitoring the changes in position of the reflecting spots relative to a source of the coherent light beam.

BACKGROUND ART

U.S. Pat. No. 4,022,532 discloses a system for monitoring a surface so as to detect any deviation from the desired configuration caused, for example, by warping. The system of that patent places reflecting spots at sample points on the surface to be monitored, a laser for producing a beam of monochromatic light, and lenses for illuminating the surface to be monitored with collimated laser light through a beamsplitter such that half of the laser beam is directed to a reciprocating reflecting surface for producing a phase oscillating reference beam for interference at detectors with light from the reflecting spots. The reference beam thus produces interferometric optical signals from light returned by the reflecting spots. The phase pattern of the interferometric signals is known when all is well, i.e., when the configuration of the surface has not changed. Consequently, the procedure for monitoring the configuration of the surface is to look for any deviation in the phase of the interferometric optical signals. A problem with this sample point interferometric system for optically monitoring the configuration of a surface, such as the surface of a paraboloid reflector for a telescope, is the need for reciprocating parts to produce the phase modulated reference beam.

An undated document, Final Report, Task 1, titled "A Simple Tilt and/or Phase Sensor" by Dr. Roland Shack of the University of Arizona, describes an equal path length interferometer for monitoring the position of reflecting spots on a surface using a laser and a "bed-of-nails" grating to divide the coherent laser beam into four equally spaced beams A, B, C and D. Light from these beams returned by the reflecting spots on the surface being monitored impinge on the grating, and as each impinges on the grating, it is also divided into four beams which proceed to a detector plane where four detectors are placed to receiver overlapping light from two divided beams. Thus, at each detector, the two beams received produce an interferometric signal that is indicative of the optical path difference between the beams. Any tilting or warping of the surface will produce a change in the interferometric signals received by the detectors. The task then is to extract the phase difference from the signals, which requires a complex optical system. Thus, although the concept of such an equal path length interferometer for monitoring the configuration of a surface is quite simple, its optical implementation is quite complex.

STATEMENT OF THE INVENTION

An object of this invention is to provide a system for optically monitoring the configuration of a surface using at least two or three retroreflectors and preferably a plurality of sets of three orthogonally placed retroreflectors, the sets being arrayed on the surface to be monitored and oriented in the same way with respect to orthogonal axes, such as the horizontal and vertical axes of the array and using a beam of linearly polarized coherent light with means for continuously rotating the direction of polarization of the linearly polarized coherent light beam through 360°. A stationary halfwave plate is placed over one retroreflector of each set for continually producing a phase shift through 360° of the retroreflected beam. The one retroreflector of each set of three orthogonally placed retroreflectors selected to be covered by a halfwave plate is positioned in the corner. A beamsplitter reflects the retroreflected beams through a lens or array of lensletts onto a bed-of-nails (BON) phase grating diagonally oriented with respect to the reflected beams of the three orthogonally placed retroreflectors of each set. The BON phase grating disperses the three reflected beams of each set whereby a dispersed beam from the corner retroreflector of each set overlaps dispersed beams from the other two retroreflectors of the set to produce two interferometric beam signals. Sets of two light intensity detectors are arrayed to receive and detect separately the pairs of interferometric beam signals thus produced.

By diagonally orienting X and Y axis of the BON phase grating with respect to the common orthogonal axes of retroreflectors of each set, the phase grating disperses light in four orthogonal directions parallel to the X and Y axis of the grating which are then combined to produce interferometric signals that contain information as to the magnitude and direction of changes in position of the corner retroreflector of each set with respect to each of the other two retroreflectors of the set.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 5 illustrates the dispersal of light from the retroreflectors A, B and C shown in FIG. 4 by a rectangularly crossed phase grating shown in FIG. 1.

FIG. 6 illustrates two interferometric signals produced by one pair of detectors associated with one segment.

DETAILED DESCRIPTION OF THE INVENTION

Figure 1:
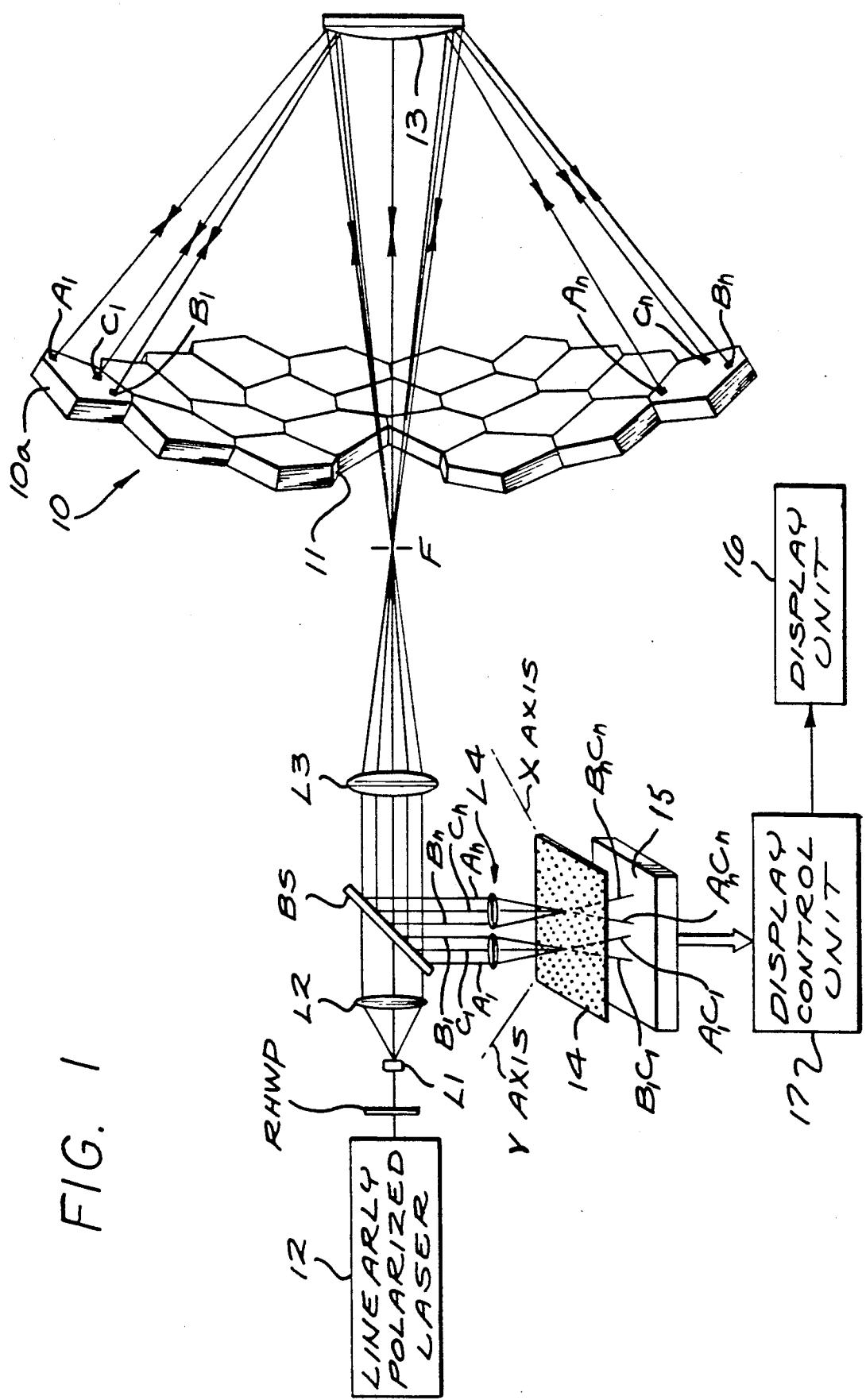
FIG. 1 illustrates schematically a system in accordance with the present invention for monitoring the configuration of an array of segments of a segmented reflecting surface (shown in cross section along a line 1—1 in FIG. 2).
Figure 2:
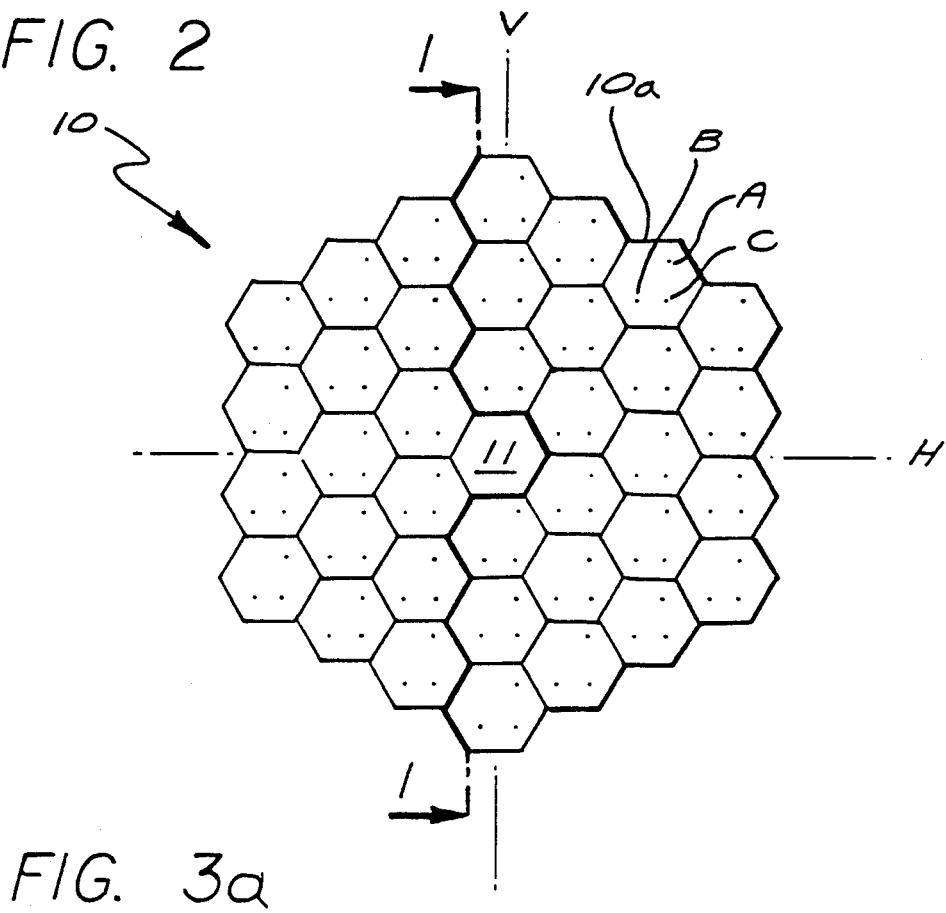
FIG. 2 is a front view of the array of segments of the reflecting surface shown in FIG. 1.

Referring to FIG. 1, a parabolic optical or radar reflector 10 is illustrated in cross section taken along a line 1—1 in FIG. 2 which shows in a front view a segmentation pattern of the reflector. For convenience the cross-section line 1—1 is taken along edges of segments 10a. Note that at the center of the pattern there is an opening 11 (absence of a segment). A pencil beam of light from a linearly polarized laser 12 passes through a diverging lens L1 and collimating lens L2 and is focused by a lens L3 into a virtual point at a plane F. The focused laser beam then expands and passes through the opening 11 in the reflector 10 and is reflected onto segments 10a by a secondary hyperbolic reflector 13, which is small enough to maintain its position and optical figure without any problems. The problem is with the primary reflector 10 which is normally so large that it may easily change configuration. For ease of manufacture, it is fabricated in segments that are assembled on site, such as in a large observatory telescope. Light from distant objects enters from the right and is reflected by the primary and secondary reflectors onto the focal plane F.

Figure 3A:
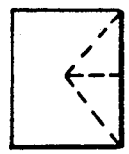
FIG. 3a illustrates a side view of a retroreflector used in positions A and B on each segment as shown in FIG. 4.
Figure 3B:
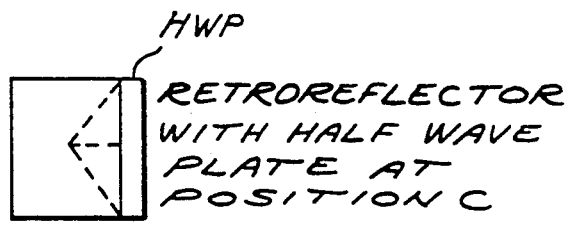
FIG. 3b illustrates a side view of a retroreflector having a halfwave plate in front of it for use in position C on each segment as shown in FIG. 1.
Figure 4:
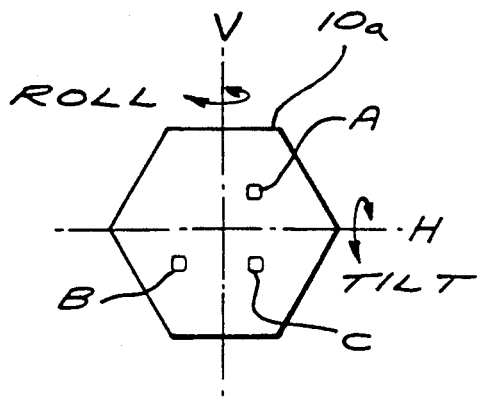
FIG. 4 is a front view of each segment shown in FIG. 1 showing the orthogonally positioned points A, B and C of retroreflectors.

Because the segmented reflector 10 is so large, the segments 10a are likely to deviate from their initial position. In order to periodically monitor the configuration of the reflector 10 after initial alignment using the beam of light from the linearly polarized laser 12, three retroreflectors are positioned at points A, B and C on the reflecting surface of each segment 10a as shown in FIG. 4. A side view of a retroreflector used at points A and B is shown in FIG. 3a and a side view of a retroreflector used at point C is shown in FIG. 3b with a halfwave plate RHWP over it in order to continuously phase shift the retroreflected laser light through 360° at a constant rate set by the rate of rotation of the rotating halfwave plate HWP. Although the retroreflectors are shown to be of the "corner" type, they may be of any other known type, such as the "cat's eye" type.

FIG. 4 illustrates the orthogonal placement of the retroreflectors at points A, B and C on a reflector segment 10a. That placement is said to be orthogonal because lines connecting points A, B and C form a 90° corner at point C.

In order to achieve an equal path, phase shifting, sample point interferometer for the purpose of detecting any change in the configuration of each segment 10a of the primary reflector 10, the phase of the laser beam is continuously phase shifted through 360° by continuously rotating the direction of linear polarization of the pencil laser beam using a rotating halfwave plate RHWP (or some other means such as by sinusoidally varying an electric field applied to a Pockels cell). After the beam diverges from the virtual point in the focal plane F, it passes through the opening 11 in the reflector 10 to the secondary reflector 13 to flood the array of segments 10a. The beam passes twice through the stationary halfwave plate HWP over the retroreflector used at point C shown in FIG. 3b, and in so doing it is continuously phase shifted through 360° because the direction of polarization of the linearly polarized laser beam passing through is continuously rotated through 360°. Thus, while the rotating halfwave plate RHWP causes rotation of the direction of linear polarization, the stationary halfwave plate HWP at the retroreflector of point C causes the beam of rotating linear polarization to be continuously phase shifted through 360° as the direction of linear polarization continuously rotates through 360°. This phase shift is, of course, relative to the linearly polarized light beam reflected by retroreflectors at points A and B.

The reference characters A, B and C are being used for the retroreflectors and the points on the reflector segments 10a at which the retroreflectors are placed, as well as for the beams retroreflected from those points since there is a one-for-one correspondence between them. The convenience of referring to the retroreflectors, the retroreflected beams and the points at which the retroreflectors are placed by the same reference characters simplifies the text. Thus, given a linearly polarized laser beam with a continuously rotating direction of polarization, the light reflected by the retroreflector C of a reflector segment 10a is continuously phase shifted relative to the incident beam through 360° by the stationary halfwave plate in front of the retroreflector. The period of each cycle of phase is set by the rate of rotation of the direction of polarization of the linearly polarized light from the laser, i.e., by the rate of rotation of the rotating halfwave plate RHWP.

Light beams from points A, B and C are reflected by a beamsplitter BS in the light path between lenses L2 and L3 onto a lens or lenslett array L4, one lenslett for each primary reflector segment 10a. The beams A, B and C from each reflector segment 10a are focused by the lens or lenslett array L4 onto a diagonally oriented bed-of-nails (BON) phase grating 14.

The term "bed-of-nails" phase grating arises from its design, which is a square grid of delta functions. Upon convolving the delta functions with a circular aperture function for each incident beam, a schematic diagram of the BON phase grating would look like the plan view of an array of rows and columns of the heads of nails hammered into a board. See FIG. 3 of an undated document, Final Report, Task 1, titled "A Simple Tilt and/or Phase Sensor" by Dr. Ronald Shack of the University of Arizona, which by this reference is made a part hereof. It is this array of rows and columns of circular aperture functions that is oriented diagonally with respect to the rows and columns of retroreflectors shown in FIG. 2 for reasons that will become apparent from the discussion below with reference to FIG. 5.

The beams focused onto the circular function of the BON phase grating are dispersed into orders which are symmetric with respect to the original reflected beams A, B and C with first order of dispersal in four directions parallel to the X and Y axis of the BON phase grating, as shown in FIG. 5. Since beam C is being continuously phase shifted with respect to beams A and B, there is a phase interference signal produced where the dispersed components of the beams overlap, as illustrated in FIG. 5 by circles for overlapping beams AC and BC. In that manner, phase shifting interferometry results between beams A and C and beams B and C. Thus, the BON phase grating 14 is oriented diagonally with respect to the array of incident retroreflector beams to disperse the beams A, B and C diagonally in four directions as shown in FIG. 5 such that the dispersed light of the A and C beams overlap in the circle AC while the dispersed light of the B and C beams overlap at the circle BC. The overlap of the beams A, B and C at the center circle ABC is not used. Separate light intensity detectors are provided in an array 15 (FIG. 1) for the overlapping light signals AC and BC which may be selected for display on a unit 16 by a display control unit 17. This arrangement is repeated for every one of the 36 segments shown in FIG. 2. For each associated pair of waveforms AC and BC selected, there is also selected for display corresponding initial interferometric signal waveforms AC and BC. Any change in phase between the new interferometric signals and the initial waveforms indicates a change in orientation of points A and C on the segment about a horizontal axis H and a change in orientation of points B and C about a vertical axis V.

Although a large single lens L4 may be used, it is preferred to use a separate lenslett for each segment to focus the three beams A, B and C for transmission through the phase grating 14 onto the array 15 of light detectors which are preferably fabricated in an integrated circuit chip together with circuitry that will enable the display control unit 17 to address the light detectors for display in the unit 16. An example of one pair of signals displayed is shown in FIG. 6 where the initial interferometric signal is identified by the reference numeral 1 and the present interferometric signal is identified by the reference numeral 2. In order to distinguish which is which as displayed, the present signal may be displayed as a dashed line, or vice versa.

The reflector 10 is initially assembled and aligned using other equipment, such as a modified Shack-Hartman camera used in the prior art to bring the edges of adjacent segment panels into place. See G. Chanan, T. Mast, J. Nelson, "Keck Telescope Primary Mirror Segments: Initial Alignment and Active Control," Keck Observatory Report No. 171, April 1988 (also published in Proceedings of the ESO Conference on Very Large Telescopes and their Instrumentation, Garching, 21-24, March 1988) and J. Nelson, T. Mast and G. Chanan, "Aberration Correction in a Telescope with a Segmented Primary," Keck Observatory Report No. 180 (also published in S.P.I.E. Proceedings on Active Telescope Systems, Vol. 1114, Orlando, Fla., March 1989).

Once the initial alignment has been completed, the system illustrated in FIG. 1 is used to record the 72 interferometric signals AC and BC for the 36 segments shown in FIG. 2. Then to periodically monitor the configuration of the reflector 10, the system of FIG. 1 is again used to record the present interferometric signals AC and BC. If the current AC signal 2 now lags in phase with respect to the initial AC signal 1 as shown in FIG. 6, it is known that the segment 10a shown in FIG. 4 has been tilted down about the horizontal axis H because the phase shift of the interferometric signal AC introduced by the continuously phase shifted signal C originates at the retroreflector C which must have moved a fraction of a wavelength away from the system optics, thereby causing a phase shift in the interferometric signal AC in the direction shown. If the present AC signal 2 leads the initial AC signal 1, the converse is true. In that way, the direction of change about the horizontal axis H is known for the segment 10a, and the extent of the change is known from the extent of the change in phase. Similarly, if the present BC signal 2 leads the initial BC signal 1, as shown in FIG. 6, it is known that the segment 10a shown in FIG. 4 has rotated clockwise about the vertical axis (looking down on the segment along the vertical axis) so that the BC signal 2 leads the initial BC signal 1, and again the extent and direction of the change is known from the extent and direction of the change in phase.

Thus, light returned through the focusing lens from each set of retroreflectors on the surface to be monitored is reflected by the beamsplitter positioned between the collimating and focusing lens and focused by the lenses L2 and L3 or lensletts L4 onto the phase grating, which disperses light received from each of the three retroreflectors in four directions diagonal to the orthogonal arrangement of the three retroreflectors. Light dispersed from the retroreflector at the corner of the orthogonal arrangement overlaps light dispersed from the other two retroreflectors, causing two separate interferometric signals to be produced at two detectors. The two interferometric signals each have a phase which changes as the positions of the three retroreflectors relative to each other changes. A change in the relative positions of three retroreflectors in a set on the surface to be monitored thus produces a change in the phases of the two interferometric signals. Those changes in phase indicate not only the magnitude but also the direction of change in the position of the set of three retroreflectors and therefore indicate the change in the configuration of the reflector at the location of the set of three retroreflectors.

Although particular embodiments of the invention have been described and illustrated herein, it is recognized that modifications and variations may readily occur to those skilled in the art. Consequently, it is intended that the claims be interpreted to cover such modifications and variations.

I claim:

1. A system for optically monitoring the configuration of a surface comprising at least two retroreflectors arrayed on said surface, and a source of linearly polarized and collimated coherent light, said source including means for continuously rotating the direction of polarization of the linearly polarized coherent light through 360°, one of said retroreflectors having a stationary halfwave plate over it for continually producing a phase shift through 360° of the reflected beam from only said one of said retroreflectors, a beamsplitter for diverting retroreflected light beams in a direction at an angle with respect to the direction of incident light directed from said source to said surface, a bed-of-nails phase grating diagonally oriented with respect to the orientation of said retroreflected and diverted beams, and a light intensity detector positioned to receive light from said phase grating, a lens for focusing said two retroreflected beams onto said bed-of-nails phase grating thereby dispersing said two retroreflected beams through said lens onto said bed-of-nails phase grating whereby a dispersed beam from one retroreflector overlaps the dispersed beams from the other retroreflector to produce at said light intensity detector an interferometric beam signal that contains information as to the magnitude and direction of changes in position of one retroreflector with respect to the other retroreflector.

2. A system for optically monitoring the configuration of a surface comprising three retroreflectors in a set, said three retroreflectors being placed on said surface such that lines in said surface connecting each of two retroreflectors with a third retroreflector form a 90° corner at said third retroreflector, a source of a linearly polarized and collimated coherent light, said source including means for continuously rotating the direction of polarization of the linearly polarized coherent light through 360°, said third retroreflector of said three retroreflectors having a stationary halfwave plate over it for continually producing a phase shift through 360° of the reflected beam from only said third retroreflector of said set of three retroreflectors relative to said two retroreflectors, a beamsplitter for diverting retroreflected light beams from said set of retroreflectors in a direction at an angle with respect to the direction of incident light directed from said source to said surface, a bed-of-nails phase grating diagonally oriented with respect to the orientation of said retroreflected and diverted light beams, and two light intensity detectors positioned to receive light from said phase grating, one detector being positioned to detect overlapping light from said third retroreflector and one of said two retroreflectors of said set of three retroreflectors, and the other detector positioned to detect overlapping light from said third retroreflector and the other of said two retroreflectors of said set of retroreflectors, whereby said phase grating disperses three retroreflected beams of said set to produce at said two detectors two interferometric beam signals that contain information as to the magnitude and direction of changes in position of said third retroreflector in respect to each of said two retroreflectors.

3. An equal path, phase shifting, sample point system for monitoring the optical position of a reflecting surface by detecting a phase shift of an interferometric signal between light reflected from at least two spaced sample points on said surface comprising a source of a linearly polarized coherent light beam,
means for continuously rotating the direction of linear polarization of said light beam through 360°,
optical means for collimating and focusing light from said polarization rotating means along an optical path to said surface at a focal plane of said surface,
a retroreflector placed at each of said two spaced sample points and oriented to reflect light back through said focal plane and said optical means,
a stationary halfwave plate placed over one of said two retroreflectors, thereby causing light retroreflected back through said stationary halfwave plate to be continuously phase shifted through 360°,
a beamsplitter in the optical path of said optical means for directing retroreflected light from said two retroreflectors at an angle from said optical path,
a phase grating positioned and oriented for diagonal dispersal of light transmitted through it with respect to a line between retroreflected beams from said two retroreflectors on said surface, thereby causing overlap in the dispersed light of said two beams, and
at least one photodetector positioned to receive overlapping light of said two beams dispersed by said phase grating, whereby said photodetector produces a sinusoidal interferometric signal, the change in phase of interferometric signal indicating the extent of change in the relative optical path length from said two retroreflectors, and the direction of phase shift of said interferometric signal indicating the direction of change in the relative optical path length of said two points.

4. An equal path, phase shifting, sample point system for monitoring the optical position of a reflecting surface as defined in claim 3 wherein a third spaced sampling point is utilized by detecting a phase shift of two interferometric signals between light retroreflected from three spaced sample points on said surface further including a third retroreflector to provide a set of three retroreflectors, one placed at each of said three sample points and oriented to reflect light back through said focal plane and said optical means, said three light retroreflectors being placed on said surface such that lines in said surface connecting each of two retroreflectors with a third retroreflector form a 90° corner at said third retroreflector, and said stationary halfwave plate being placed over said third retroreflector, and at least two photodetectors positioned to receive two beams of overlapping light of said third retroreflector with each of the remaining two retroreflectors dispersed by said phase grating, each of three retroreflected beams thus overlapping in two areas between light of said third retroreflector and each of the other two retroreflectors, whereby said two photodetectors produce two interferometric signals sinusoidally modulated by phase shift in light transmitted through said stationary halfwave plate over said third retroreflector relative to each of the other two retroreflectors, whereby a change in phase of either of said two interferometric signals indicates the extent of change in the position of said third retroreflector relative to said two retroreflectors, thereby indicating a change in position of said reflecting surface about two orthogonal axes, each axis perpendicular to the spacing direction of said third retroreflector with respect to one of said two retroreflectors.

5. An equal path, phase shifting, sample point system for monitoring the optical figure of a reflecting surface comprising a source of a linearly polarized coherent light beam,
means for continuously rotating the direction of linear polarization of said light beam through 360°,
optical means for collimating and focusing light from said polarization rotating means along an optical path to a focal plane of said reflecting surface,
a plurality of sets of retroreflectors arrayed over said surface, each set consisting of three retroreflectors placed on said reflecting surface such that lines in said surface connecting each of two retroreflectors with a third retroreflector of a set form a 90° corner at said third retroreflector, all of said sets being oriented the same way with respect to orthogonal reference axis relative to said reflecting surface,
a separate stationary halfwave plate over said third retroreflector of each set, thereby causing light reflected back through said stationary halfwave plate to be continuously phase shifted through 360° with respect to light reflected back through each of said two retroreflectors of each set,
a beamsplitter in the optical path of said optical means for directing reflected light from said sets of retroreflectors at an angle with respect to said optical path,
a bed-of-nails phase grating diagonally oriented with respect to orientation of light beams from said sets of retroreflectors for dispersal of light transmitted through it from each retroreflector at 45° from orthogonal lines between light beams from each of said array of sets of retroreflectors, an array of light intensity detectors in sets of two, one set of two detectors for each set of three retroreflectors positioned to receive overlapping light from said third retroreflector and each of said two retroreflectors of each set of three retroreflectors, whereby each photodetector produces a sinusoidal interferometric signal modulated by phase shift in light transmitted through said stationary halfwave plate over said third retroreflector relative to said two retroreflectors, the change in phase of said interferometric signal indicating the extent of change in position of said third retroreflector relative to said two retroreflectors of a set, with the direction of change in phase of said interferometric signal indicating the direction of change in position of said third retroreflector with respect to said two retroreflectors of a set.

6. An equal path, phase shifting, sample point system for monitoring the optical figure of a reflecting surface as defined in claim 5 wherein said surface is comprised of contiguous segments, each segment having one of said sets of retroreflectors, whereby the change in position of each segment is monitored separately to determine any changes in optical figure of said surface.

* * * * *